United States Patent [19]

Matson

[11] 4,444,571
[45] Apr. 24, 1984

[54] ENERGY-EFFICIENT PROCESS FOR THE STRIPPING OF GASES FROM LIQUIDS

[75] Inventor: Stephen L. Matson, Bend, Oreg.

[73] Assignee: Bend Research, Inc., Bend, Oreg.

[21] Appl. No.: 472,713

[22] Filed: Mar. 7, 1983

[51] Int. Cl.³ .............................................. B01D 53/22
[52] U.S. Cl. .......................................... 55/16; 55/49; 55/51; 55/54; 55/73
[58] Field of Search ......................... 55/16, 46, 48–51, 55/53, 54, 89, 158, 73; 203/25, 39, 41; 423/232, 233

[56] References Cited

U.S. PATENT DOCUMENTS

| | | | |
|---|---|---|---|
| 2,970,106 | 1/1961 | Binning et al. | 203/39 X |
| 3,109,782 | 11/1963 | Nathan | 203/25 |
| 3,303,105 | 2/1967 | Konikoff et al. | 203/39 X |
| 3,324,626 | 6/1967 | Dresser et al. | 55/16 |
| 3,395,086 | 7/1968 | Victor | 203/41 X |
| 3,420,069 | 1/1969 | Booth | 55/16 X |
| 3,632,505 | 1/1972 | Nelson | 203/39 X |
| 3,851,041 | 11/1974 | Eickmeyer | 423/232 X |
| 4,181,506 | 1/1980 | Bengtsson | 55/50 X |
| 4,316,774 | 2/1982 | Trusch | 203/41 X |
| 4,344,826 | 8/1982 | Smith | 203/DIG. 16 |

Primary Examiner—Robert H. Spitzer
Attorney, Agent, or Firm—Chernoff, Vilhauer, McClung, Birdwell & Stenzel

[57] ABSTRACT

A process is disclosed for the recovery and reuse of the heat contained in the gas/vapor overhead mixture from a stripping column in which a noncondensable gas is stripped from a liquid solution by contacting the solution with a hot vapor such as steam. The steam or other vapor in the overhead mixture is separated from the non-condensable gas or gases by preferentially passing the vapor through a semipermeable membrane. The water or other condensable vapor is then compressed and either reinjected at the bottom of the stripping column or condensed in the column reboiler, thus permitting its reuse in the stripping process. If the compressed vapor is reinjected into the stripping column, it serves as the stripping medium itself. If the compressed vapor is condensed in the column reboiler, its latent heat of vaporization is thereby recovered and used to generate the required stripping vapor by boiling the solution being stripped.

23 Claims, 4 Drawing Figures

ENERGY-EFFICIENT PROCESS FOR THE STRIPPING OF GASES FROM LIQUIDS

BACKGROUND OF THE INVENTION

This invention relates to a method for improving energy recovery in various industrial stripping processes wherein a gaseous component is removed from a liquid by effecting its volatilization and then carrying it away by contact with a stream of hot, condensable vapor. More particularly, the invention is concerned with stripping absorbed gases from liquid absorbents used in various gas-purification processes and with removing high-vapor-pressure contaminants from process condensate and other waste water streams. These are common, energy-consuming unit operations in industrial chemistry.

Stripping operations such as these involve the removal of relatively noncondensable, high-vapor-pressure gaseous components from liquid mixtures. In the case of aqueous solutions, steam is the preferred stripping vapor, and it may be supplied either by reboiling the aqueous solution being stripped and vaporizing a portion of it or by injecting live steam near the base of the stripping column. Organic liquids can be stripped of gases in a similar fashion. Stripping vapor and liquid may be contacted, usually in a countercurrent fashion, in a packed column, a plate column, or other type of two-phase contactor as described by Ludwig in Volume 2 of *Applied Process Design for Chemical and Petrochemical Plants* (1964).

Stripping vapor serves three purposes in a stripping operation. First, it provides the energy required to heat the liquid (thereby increasing the tendency of dissolved gases to desorb). Secondly, it supplies the heat effect associated with gas desorption. This heat effect is typically small for a physically sorbed gas where only its heat of solution is involved, but the heat effect can be much larger when reversible chemical reactions take place in sorption. Thirdly, stripping vapor serves as a diluent for desorbed gases, thereby increasing the driving force for desorption and sweeping desorbed gases out of the stripping vessel.

A condensable vapor is preferred as the stripping agent because the vapor is readily separated from the stripped gas by condensation in an overhead condenser. Additionally, a vapor possesses the advantages of being easily generated by reboiling the stripped solution, and it can carry large quantities of energy in the form of its latent heat of vaporization.

Unfortunately, separation of the stripping vapor from the stripped gas in the gas/vapor overhead mixture is a very wasteful process, involving as it does condensation of the vapor and attendant loss of its latent heat to the condenser cooling medium, usually cooling water. Because the latent heat of the mixed vapor is lost, external energy must be supplied in order to generate fresh stripping vapor. As a result, the unit operation of stripping a gas from a liquid is generally a very energy-intensive one.

Stripping operations arise in a large number of chemical processing situations. For example, the most important gas-purification technique is undoubtedly gas absorption, and regeneration of the rich absorbent is generally accomplished in a stripping step (sometimes accompanied by a flashing operation). For example, hydrogen sulfide and carbon dioxide are often removed from sour natural gas, coal gas and chemical process/refinery gas streams by absorption in aqueous solutions of reversibly reactive bases. Examples of $H_2S$ and $CO_2$ removal processes employing aqueous absorbents include the mono- and diethanolamine processes, the Sulfinol process, the diglycolamine process, and the carbonate processes including the Benfield, Catacarb, and Giammarco-Vetrocoke processes. Each of these absorbents is regenerated in a steam stripping operation, either by injection of live steam into the stripper or by reboiling the lean stripper bottoms liquor. In addition to the above processes involving chemically reactive absorbents, there exist other processes for $H_2S$ and $CO_2$ removal wherein the absorbent liquid is merely a physical solvent for the acid gases. The Rectisol and Selexol processes provide two examples. Again, solvent regeneration is accomplished in these processes by steam stripping. Ammonia, sulfur dioxide, carbon monoxide, and still other gases can be removed by absorption/desorption process technology as described by Kohl and Riesenfeld in *Gas Purification*, 3rd edition (1979).

Steam stripping operations also arise in the context of removing high-vapor-pressure contaminants from aqueous process waste streams. For example, sour water and other chemical process and refinery condensate streams frequently contain high concentrations of $H_2S$ and $NH_3$ that must be reduced prior to disposal or reuse of the water. Holiday describes such processes in *Chemical Engineering* 90(1982)118. Separation of these gases is frequently accomplished by steam stripping the contaminated stream. In other processes, for example, in the production of polymeric resins, process-water streams may be contaminated with highly volatile (albeit condensable) solvents such as methylene chloride. Steam stripping is frequently employed for removal of such volatile solvents from waste water streams.

A number of methods have been proposed for recovery of the energy and in particular the latent heat contained in the gas vapor mixture produced in a stripping operation. For example, instead of losing the heat of condensation to cooling water in a water-cooled condenser, it is known that stripping efficiency can be improved by transferring the energy contained in the gas/vapor overhead mixture to the stripper feed stream in a heat exchanger/condenser designed to preheat the column feed. Alternatively, the overhead mixture can be condensed against some other process stream which it is necessary to heat to a temperature somewhat below the condensing range of the gas/vapor mixture from the stripper. Unfortunately, there are usually few places for economical recovery of energy at the relatively low temperatures associated with condensation of the gas/vapor overhead mixture.

A more generally applicable method for improving the energy efficiency of stripping operations is vapor compression as discussed by King in *Separation Processes*, pages 695–699, 2nd edition (1980) and in the Holiday reference cited above. In this technique, the overhead vapor from the stripping column is mechanically compressed and subsequently condensed with recovery of its latent heat, usually in an indirect heat exchanger which serves to reboil the stripped liquid. Although vapor compression works well in the absence of noncondensable gases (e.g., in distillation) or in stripping operations in which the concentration of noncondensables in the overhead mixture is small, the technique is not very efficient when large concentrations of stripped gas are present in the overhead mixture. In such cases, the method can be impractical due to the large energy requirement associated with compressing all of the stripped gas along with the stripping vapor. Moreover, the presence of large quantities of noncondensable gases in the mixture limits the fraction of the vapor which can be condensed and recovered at a particular set of operating conditions. Finally, noncondensable gases have the undesirable effect of blanketing heat transfer surfaces and reducing rates of heat exchange in the condenser/reboiler. As a result, applications of vapor compression schemes to stripping operations are limited.

Another heat recovery technique known in the art is the use of heat pumps to extract energy from the gas/vapor overhead mixture at the condensing temperature and to return it to the process at the higher temperature associated with solution reboiling. Heat pump schemes are similar in concept to vapor compression, with the exception that an external working fluid is employed in the former. They are generally subject to the same limitations inherent in vapor compression when applied to stripping processes.

Semipermeable media have been used in the past for the recovery of vapors from mixtures with gases. For example, Booth, in U.S. Pat. No. 3,420,069, describes a condenser-separator in which a heat exchanger constructed from porous sintered metal tubes is used to remove condensed and entrained liquids from gas streams, although without significant heat recovery. Ketteringham and Leffler, in U.S. Pat. No. 3,511,031, describe a similar means for dehumidifying air in an enclosed space such as the cabin of a spacecraft by condensing water vapor in pores of microporous membranes, again without heat recovery. Finally, Salemme, in U.S. Pat. No. 3,735,559, discloses a process for removing water from a moist air stream which utilizes a permselective membrane for water vapor transport. However, none of these patents is concerned with the stripping of gases from liquids, and none discloses significant recovery of the latent heat of the vapor for reuse.

It is further known in the art that microporous membranes may be used in distillation processes. The membrane separates distilland from distillate in these schemes, and a temperature gradient is generally maintained across it. The temperature gradient effects evaporation of the more volatile component from the distilland mixture on one side of the membrane, and it effects condensation of distillate on the other. For example, distillation methods and apparatus employing microporous membranes are disclosed by Cheng in U.S. Pat. No. 4,265,713 and by Rodgers in U.S. Pat. Nos. 3,477,917, 3,650,905, 3,661,721, 3,765,891, and 3,896,004. Composite membranes comprised of hydrophobic and hydrophilic or of lyophobic and lyophilic regions have also been described for this purpose by Cheng in U.S. Pat. Nos. 4,265,713 and 4,316,772, respectively. Pampel, in U.S. Pat. No. 4,301,111, further discloses the use of a microporous membrane with an air pressure gradient maintained across it in order to effect distillation of a liquid mixture. However, none of the above patents is concerned with the stripping of gases from the liquid distilland, and none discloses significant recovery of the latent heat of the vapor for reuse. Moreover, the microporous membranes employed in these cases are not selective for the permeation of vapor in preference to gas.

Guarino, in U.S. Pat. No. 3,540,986, discloses the use of a membrane in a distillation/condensation apparatus wherein heat is recovered from the distilled vapor following vapor compression. However, the membrane employed is microporous and serves only to separate distilland liquid from distillate vapor (there being no noncondensable gas present and the membrane having no vapor/gas selectivity).

To summarize, known industrial processes for the removal of noncondensable gases from liquid absorbents and process waste water streams frequently involve contacting the liquid with a relatively hot stripping vapor that carries the desorbed gases from the stripper and supplies the energy required to heat the liquid and to desorb the gas. The mixture of stripped gases and stripping vapor that leaves the top of the column is frequently routed to an overhead condenser or heat exchanger which condenses the vapor and thereby separates it from the stripped gases. Recovery of the energy in the stripper overhead mixture is a longstanding and important problem that remains to be solved in an economical and practical manner.

It is therefore an object of the present invention to provide a method for recovering a significant fraction of the sensible and latent heat present in the gas/vapor overhead mixture from a stripping column in order to permit reuse of that energy in the stripping process and thereby to improve the energy efficiency of stripping to an extent and in a manner not previously contemplated.

This object is accomplished by the present invention, which is summarized and described below.

SUMMARY OF THE INVENTION

The present invention lies in a utilization of the fact that a gas-free vapor is much more economically compressed from an energy standpoint than is a mixture of gas and vapor. The invention comprises a method for recovering energy in processes in which a gas is stripped from a liquid by contact with a vapor. According to the present invention, there is provided a process which employs a semipermeable membrane to separate gas/vapor mixture into two streams containing relatively pure components. By this means, efficient recovery of the energy contained in the vapor stream can be realized.

In one embodiment, the present invention comprises a method for recovering and reusing both the sensible heat and the heat of condensation in the gas/vapor mixture exiting overhead from a stripping column. According to this embodiment, the gas/vapor mixture is separated into two streams by passing the vapor in the mixture through a semipermeable membrane that is permeable to vapor, but that retains the gaseous component of the overhead mixture. The substantially gas-free vapor is then condensed by applying a pressure sufficient to bring the vapor to its dewpoint. Compression of the vapor requires relatively little energy compared to the energy released upon condensation of the vapor. This latent heat of condensation is recovered in a heat exchanger or reboiler and is thereby returned to the stripping process. Alternatively the compressed and superheated vapor may be injected directly into the stripping column to serve as the stripping agent. A small amount of reboiler make-up heat or stripping agent may be provided as required at the base of the stripping column.

DETAILED DESCRIPTION OF THE INVENTION

Figure 1:
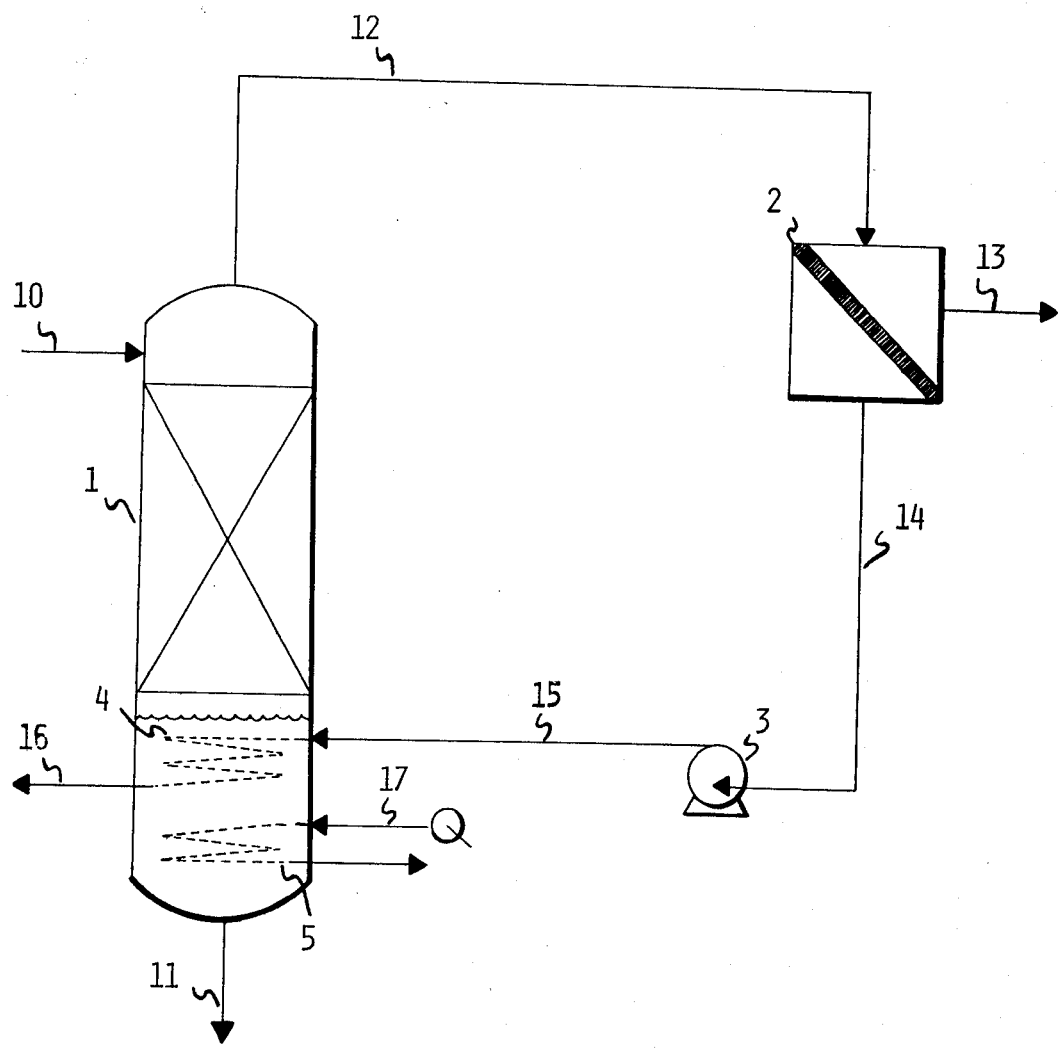
FIG. 1 is a schematic drawing of a stripping system within the scope of the present invention wherein the vapor separated from the gas/vapor stripper overhead mixture is condensed by heat exchange in the stripping column reboiler, thus generating stripping vapor within the column.

An exemplary embodiment of the process of the present invention is shown in FIG. 1. Stripper feed stream 10 is a liquid or liquid solution that contains a physically or chemically absorbed gas or gases. This gas-rich absorbent is fed to the top of stripping column 1, preferably a packed column, plate column or other type of two-phase contacting device. As the liquid descends through the stripping column, it is contacted with a rising flow of stripping vapor generated by reboiling the liquid that accumulates in the base of the stripping column. The lean liquid stream 11, stripped of dissolved gases, then exits from the bottom of the stripping column and is routed, for example, to the absorber of a gas-purification process or to waste disposal. Desorbed gases are mixed with and diluted by the upflowing stripping vapor, producing a mixed gas/vapor stripper overhead stream 12 which exits the top of the stripping column.

This mixture 12, containing both condensable stripping vapor as well as substantially noncondensable stripped gases, is brought into contact with a semipermeable membrane 2 that is substantially permeable to vapor and substantially impermeable to the noncondensable gases. The membrane splits the gas/vapor stripper overhead 12 into two streams: a vapor stream 14 and a non-permeating gas stream 13. The vapor drawn through membrane 2 is compressed in vacuum pump or compressor 3, producing vapor stream 15 at a relatively high pressure, this compression being accomplished with less energy than would be required were the noncondensable gaseous component still present. Compression of the vapor increases its saturation temperature, the temperature at which the vapor condenses at the pressure prevailing in stream 15. This increase in the temperature of vapor condensation improves the availability of the recovered latent heat, thereby increasing the opportunities for its reuse in the stripping process.

The heat of condensation of this compressed vapor is removed in heat exchanger/reboiler 4, thus producing a stream of condensed liquid 16 that can be reused as make-up absorbent, refluxed to the stripping column, or simply discharged from the system as in a waste water treatment application. Condensate stream 16 may also contain some uncondensed vapor and minor amounts of noncondensable gases which permeate the membrane 2. In this event, the condensate stream may pass through a secondary water-cooled condenser and a gas/liquid separator (not shown) in order to condense the remaining vapor and to separate it from the noncondensable gases.

The heat of condensation of the compressed vapor is transferred to the pool of stripped liquid in the bottom of the stripping column by means of heat exchange coils or panels 4 which serve as an internal reboiler. This heat transfer causes the stripped liquid to boil, thus generating an upflowing stream of stripping vapor. Additional energy 17 for reboiling may be introduced as required through heat exchange coils or panels 5 immersed in the lean, stripped liquid.

The present invention lies in the recovery of the sensible and latent heat in the gas/vapor overhead mixture for use in generating the required stripping vapor with a minimum of external energy input. As mentioned above, in conventional practice, the gas/vapor overhead mixture is often simply condensed in a water-cooled overhead condenser, with loss of its energy content to the cooling medium, requiring large amounts of energy to be supplied from an external source for reboiling the liquid and for generating stripping vapor.

Figure 2:
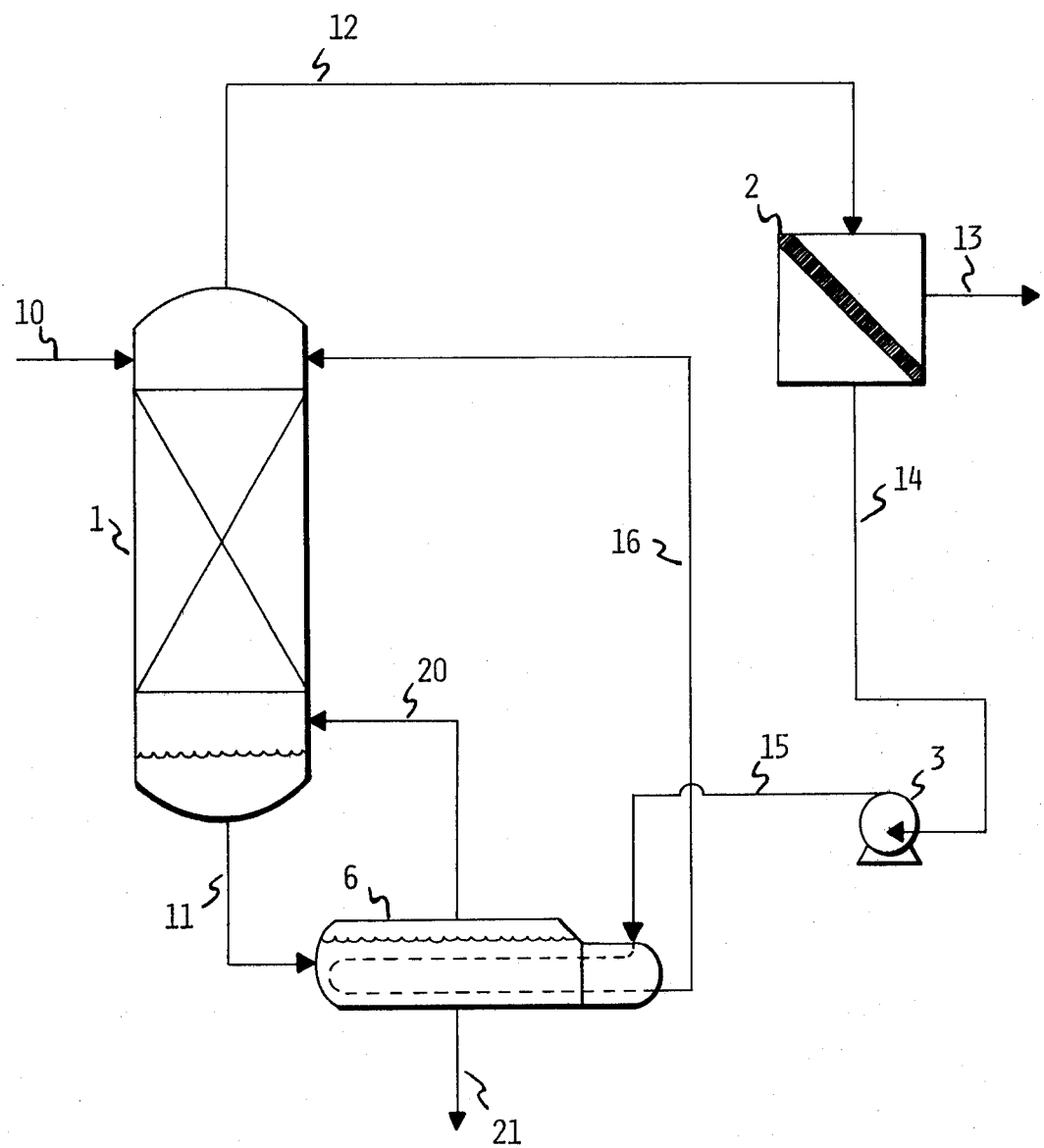
FIG. 2 is a schematic drawing of another exemplary embodiment of the present invention wherein the separated and condensed vapor is returned to the top of the stripping column where it serves as liquid reflux. An external reboiler is shown.

In another embodiment shown in FIG. 2, transfer of energy from the separated and compressed vapor stream 15 to the stripped liquid stream 11 takes place in external reboiler 6. In this embodiment, stripped liquid 11 leaves the bottom of the stripping column and is fed to the reboiler where it is partially vaporized and split into a lean liquid stream 21 and a stream of stripping vapor 20 which is returned to the stripper. Also shown in FIG. 2 is the return of the reboiler condensate stream 16 to the top of the stripping column where it serves as liquid reflux. Stream 16 may also contain some uncondensed vapor and noncondensable gases, but their presence does not interfere significantly with the stripping process portrayed in FIG. 2.

Figure 3:
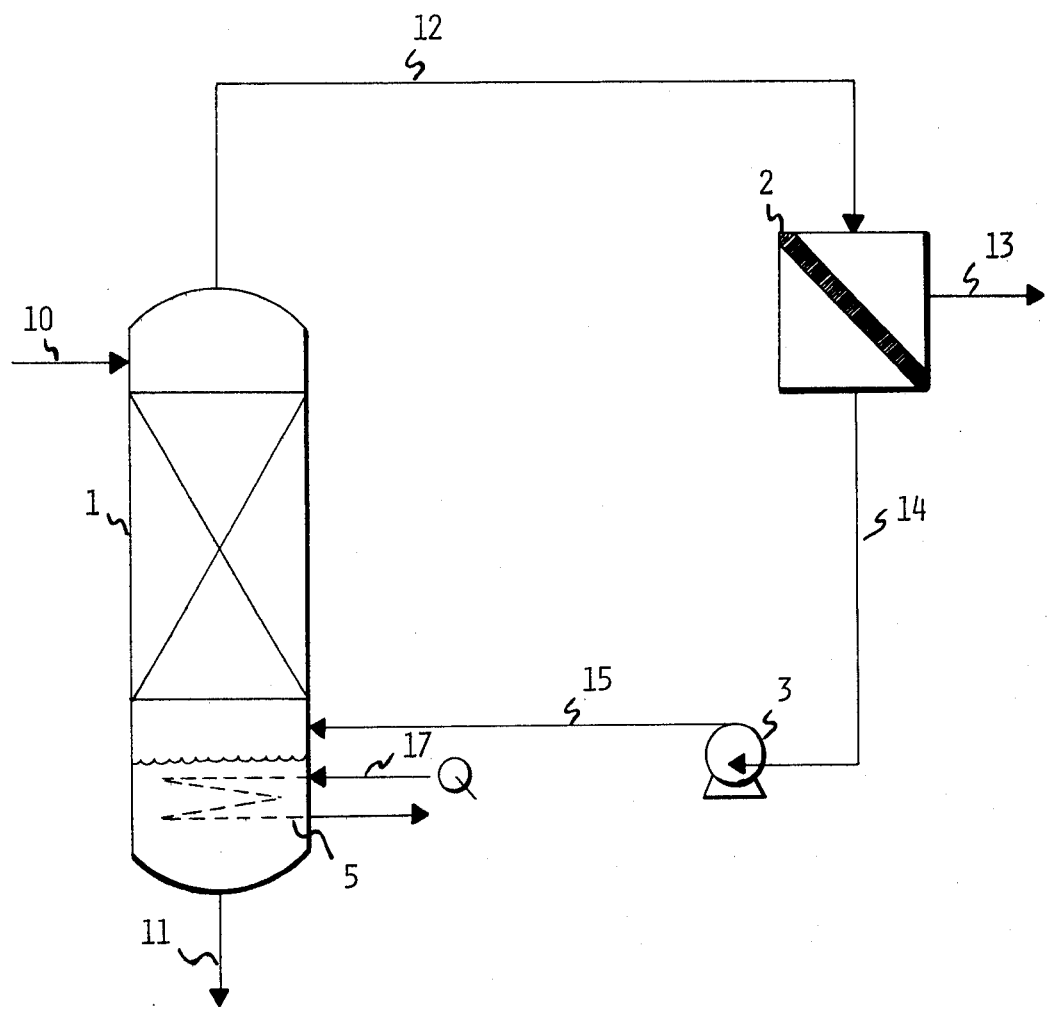
FIG. 3 is a schematic drawing of another exemplary embodiment of the present invention wherein the separated and compressed vapor is injected directly at the base of the stripper where it serves as the stripping agent.

In another embodiment shown in FIG. 3, the separated and compressed vapor stream 15 is not condensed; instead, it is injected directly into the stripper near the bottom of the column where it serves as "live" stripping vapor. Additional energy 17 may be required to generate supplemental stripping vapor in reboiler coils or panels 5.

Figure 4:
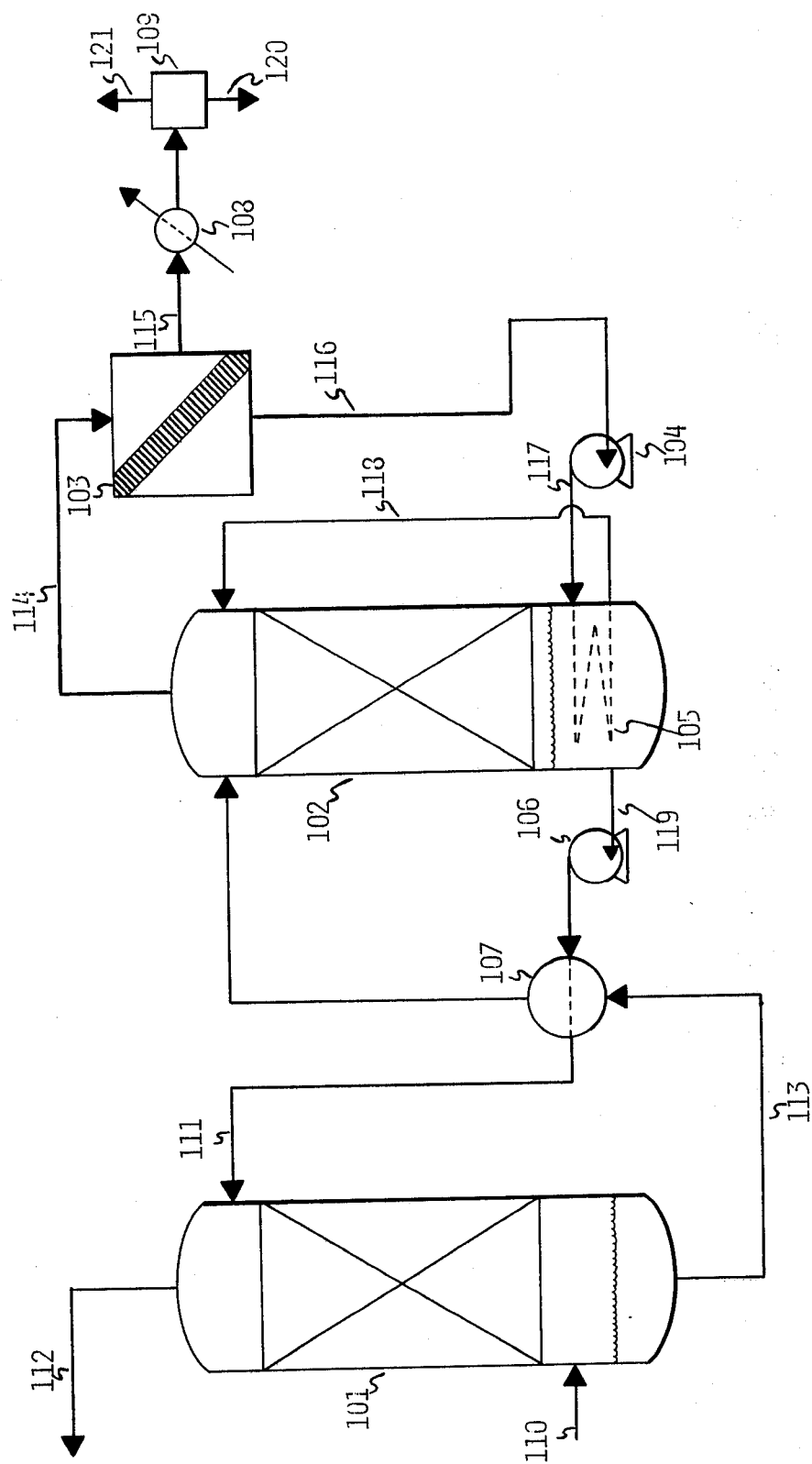
FIG. 4 is a schematic drawing of a gas-purification system within the scope of the present invention. Gas absorption takes place in the absorption column, and gas desorption and absorbent liquor regeneration occur in a separate steam stripping column. As in FIG. 2, the reboiler condensate is returned to the stripping column as reflux.

Finally FIG. 4 shows how the process of the present invention can be incorporated into an absorption process for gas purification. The gaseous mixture 110 to be purified is contacted counter-currently with absorbent liquor 111 in a packed or plate column absorber 101 to effect removal of one or more gaseous components and to produce a purified gas stream 112. The gas-rich absorbent 113 containing the dissolved gas may first be heated in heat exchanger 107 to promote volatilization of the dissolved gas, the required energy being supplied by the hot, lean liquor 119 from the stripping column 102. The hot, rich absorbent is then fed to the top of the stripping column, where its dissolved gases are desorbed by contact of the liquid with rising stripping vapor. This stripping vapor is generated by boiling the stripped liquid which accumulates in the bottom of the stripping column, the required energy being supplied through heat exchange coils or panels 105 immersed in the liquid. The lean, stripped liquid 119 is then recirculated by means of pump 106. It first passes through heat exchanger 107 and then enters absorption column 101 near its top.

The gas/vapor overhead mixture 114 which exits from the stripping column is separated into a predominantly gaseous stream 115 and a predominantly vapor stream 116 by means of vapor-permeable membrane 103. As before, the separated vapor is first compressed in compresser/vacuum pump 104, producing vapor stream 117 at a relatively high pressure, which vapor stream 117 is then condensed in internal reboiler heat-exchange coils or panels 105 with recovery of its sensible and latent heat content. In this example, the condensate stream 118 is returned to the top of the stripping column as reflux. The non-permeating, predominantly gaseous stream 115 may contain unrecovered vapor, and for this reason it may be passed through water-cooled condenser 108 and gas-liquid separator 109 in order to complete the separation of stripped gases 121 from residual condensed vapor 120.

In each of these embodiments, a substantial energy savings is realized by avoiding the condensation of stripping vapor in an overhead condenser, notwithstanding the fact that some energy is required to compress the separated vapor. In the present process, a substantial portion of the sensible and latent heat of the stripping vapor in the stripper overhead mixture is conserved, thus reducing the energy required for stripping vapor generation.

Although in theory one could recover the latent heat in the vapor exiting the stripping column without the use of a membrane by compressing the entire gas/vapor overhead mixture to the point of condensation of the vapor, this method is impractical because of the large energy requirement associated with compressing the stripped gas present with the vapor. Furthermore, large quantities of noncondensable gases in the stripper overhead mixture limit the fraction of the vapor which can be condensed in a reboiler at a particular set of operating conditions. Finally, noncondensable gases blanket heat transfer surfaces and reduce rates of heat transfer in the condenser/reboiler.

Substantial energy savings are possible with a membrane-based stripping process utilizing the present invention. A few illustrative examples will indicate the extent of energy savings possible and will illuminate certain design principles and tradeoffs important to the most beneficial practice of the present invention. Application of the invention to the stripping column or "regenerator" of a hot potassium carbonate plant designed to remove $CO_2$ from hydrocarbon gas streams is first considered. On the basis of process data presented by Field et al. in Table 6 of "Pilot Plant Studies of the Hot-Carbonate Process for Removing Carbon Dioxide and Hydrogen Sulfide," U.S. Bureau of Mines Bulletin No. 597 (1961) and by Kohl and Risenfeld *Gas Purification*, pages 187-211 (1979) there may be established the following representative hot carbonate process operating conditions and characteristics: feed gas—15% $CO_2$ at 300 psig; aqueous absorbent—35% $K_2CO_3$; stripper pressure—17 psia; stripper liquid temperatures—230° F. (rich absorbent) and 245° F. (lean, reboiled absorbent); solution carrying capacity—4.0 SCF of $CO_2$ (i.e., standard cubic feet measured at 32° F. and 14.7 psia) absorbed per gallon of solution; and regeneration efficiency—6 SCF $CO_2$/lb steam to the reboiler. At these operating conditions, the gas/vapor mixture exiting the stripping column contains approximately 35 vol. % $CO_2$ at 230° F. and 17 psia. The relative humidity of this $CO_2$/steam mixture is 53%, and the partial pressure $P_l$ of steam therein is 11.1 psi. An object of the present invention is to recover part of the sensible and latent heat of the steam contained in this mixture, rather than simply condensing the stripping steam in an overhead condenser as in conventional practice.

In this first example, it is assumed that the membrane is perfectly selective for the permeation of water vapor. The water vapor partial pressure on the product side of the membrane is reduced below $P_l$, its value in the stripper overhead mixture, by the suction of the compressor. This permeate pressure $P_2$ is sufficiently low to cause water vapor to permeate the membrane. The permeated vapor is then compressed to a higher pressure $P_3$ and routed to the reboiler where its heat content is recovered.

The theoretical or minimum work $W_{ideal}$ required to compress a certain quantity of ideal gas or vapor adiabatically depends primarily on the pressure ratio $P_3/P_2$. Per mole of compressed gas or vapor, this ideal, reversible work is given by $$W_{ideal} = \frac{\gamma RT}{\gamma - 1}\left[\left(\frac{P_3}{P_2}\right)\left(\frac{\gamma - 1}{\gamma}\right)_{-1}\right],$$

where R is the gas constant, T is the absolute temperature, and $\gamma$ is the heat capacity ratio $C_p/C_v$.

The compression ratio $P_3/P_2$ must be kept small in order to minimize energy costs. At the same time, it is desirable to maintain a low pressure $P_2$ downstream of the membrane in order to maximize the flux of water vapor across the membrane and thus reduce the required membrane area. Thus, an optimum permeate pressure $P_2$ exists. If the compressor discharge pressure $P_3$ is set at 32.5 psia in order to effect the condensation of saturated steam at 255° F.—a temperature at which the heat of condensation may be returned to the stripper in the reboiler—then a favorable permeate pressure $P_2$ is about 5.0 psia. Thus $P_3/P_2=32.5/5.0=6.5$, and the reversible, adiabatic work of permeate compression is 9.0 Btu/SCF of recovered vapor. (Because water vapor is not an ideal gas, the above equation cannot be used to calculate the minimum work of vapor compression with much accuracy; instead, reference to the thermodynamic data contained in the steam tables must be made). Since the latent heat of the water vapor contained in the permeate is about 47 Btu/SCF, the process of the present invention achieves a net energy savings of about 38 Btu/SCF, or about 81% of the latent heat of the recovered water vapor.

In order to simplify the illustration, the different grades or availabilities of thermal and of mechanical or electrical energy have been ignored. In order to account approximately for the 40% efficiency of converting thermal to mechanical or electrical energy and to put the quantities of energy cited above on a consistent basis, the stated work of vapor compression should be multiplied by a factor of about 2.5 to derive its thermal equivalent. Vapor superheat has also been omitted for the sake of simplicity. Because the compressor or vacuum pump performs work on the vapor, the pressurized vapor is superheated to a degree dependent on compressor efficiency and on the amount of heat transfer which occurs during the compression process. Any superheat is recovered upon condensation of the vapor.

In practice, the efficiency of energy recovery is affected by several other factors. Because the efficiencies of compressors and vacuum pumps are significantly lower than 100%, the ideal work of compression must be divided by the thermal efficiency $\eta_T$ in order to obtain the actual work requirement:

$$W_{actual} = W_{ideal}/\eta T$$

If $\eta T$ is taken as 70%, the actual compression work increases to 9.0/0.7 or 12.8 Btu/SCF of recovered vapor, corresponding to 27% of the recoverable latent heat of the vapor.

A fundamental limitation on the extent of energy recovery according to the process of the present invention is related to the fractional recovery of water vapor from the stripper overhead mixture. As this mixture is passed over the semipermeable membrane, it is progressively depleted of water vapor as a consequence of its selective permeation across the membrane. Consequently, the partial pressure $P_1$ of water vapor in contact with the membrane steadily decreases with residence time in the permeator, eventually falling to zero for the case of complete vapor recovery. For example, if one-half of the water vapor present in the stripper overhead mixture of the previous example were to be recovered by permeation across a perfectly selective membrane, then the partial pressure $P_1$ of water vapor remaining in the non-permeated gas/vapor mixture would fall from 11.1 to 8.2 psi. In the process, the water vapor partial pressure difference across the membrane ($P_2-P_3$) will have decreased by nearly one-half, from 6.1 psi (i.e., 11.1–5.0) to 3.2 psi (i.e., 8.2–5.0). (The mixture is assumed to behave as an ideal gas for purposes of calculating the vapor partial pressure.) As a result of this decrease in the driving force for permeation, the membrane area required to pass a given quantity of water vapor increases with the extent of vapor recovery accomplished. In addition, high vapor recovery affects the energy requirement for vapor compression by dictating a low permeate pressure $P_2$. For example, the partial pressure of residual water vapor in the non-permeated mixture is only 2.7 psi for the case of 90% vapor recovery, thus requiring that the permeate pressure $P_2$ be reduced to a value at least this low. Since the work of vapor compression increases as $P_2$ decreases, there exists some optimum extent of vapor recovery in the permeator which can only be determined by considering the economics (i.e., both capital and operating costs) of both the permeation and compression processes.

Another limitation on energy recovery by this technique results from the fact that there exists an upper limit on the temperature at which the latent heat of the vapor can be returned to the stripping process by condensation of the compressed vapor in the reboiler. As the pressure $P_3$ of the compressed vapor is increased, the saturation temperature at which the vapor condenses is also increased, thus permitting the recovered energy to be returned to the process at a higher temperature. At the same time, however, the work required for vapor compression increases with the pressure $P_3$, and at some point it becomes equal to the energy recoverable from the vapor. At this point, the efficiency of energy recovery drops to zero.

For the above example, based on a permeate pressure of 5.0 psia, the point at which the work of compression equals the latent heat recovered upon vapor condensation is encountered at a compressed water vapor pressure $P_3$ of 60.3 psia, corresponding to a saturation or condensing temperature of 293° F. Some 18.5 Btu/SCF of mechanical/electrical work are required to compress steam from 5.0 to 60.3 psi at 70% adiabatic compression efficiency. The thermal energy equivalent of this work is approximately 18.5/0.4 or 46.1 Btu/SCF, just equal to the latent heat of condensation of steam at 293° F. and 60.3 psia. Thus, the maximum temperature at which the recovered latent heat could be condensed in the stripping column reboiler is approximately 293° F., and allowance for the 10°–15° F. temperature difference required to achieve reasonable heat transfer rates further lowers the temperature of latent heat recovery to about 280° F.

In the present example with a reboiling liquid temperature of 245° F., this limitation is not encountered. Furthermore, direct injection of "live" steam (i.e., recovered and compressed stripping vapor) as in the embodiment shown in FIG. 3 could be practiced in the event that this limitation were approached. Since a direct transfer of heat occurs between the stripping vapor and the liquid in the case of live vapor injection, the requirement of a 10°–15° F. temperature difference across heat transfer surfaces is not relevant.

In actuality, the compressed water vapor of this example would be significantly superheated as a result of the large amount of work performed on it by the compressor. For adiabatic compression at 70% efficiency (driver losses neglected), the vapor would exit the vacuum pump/compressor at a temperature of about 997° F., corresponding to about 704° F. of vapor superheat. This superheat permits the breakeven reboiler temperature and condensing pressure to be further increased, and it raises the availability or effective temperature of the recovered energy. In the above example, the vapor superheat enthalpy (approximately 17.7 Btu/SCF) amounts to over one-fourth of the total energy that could be obtained by condensing the superheated vapor at 60.3 psi (i.e., enthalpy of superheat plus latent heat of vaporization, or 17.7+45.9=63.6 Btu/SCF). Thus, the effect of superheat is to raise the average temperature T at which the recovered energy can be utilized to approximately $$T = \frac{(17.7 \text{ Btu/SCF}) \frac{293° F. + 997° F.}{2} + (45.9 \text{ Btu/SCF})(293° F.)}{63.6 \text{ Btu/SCF}} = 391° F.$$

Because the energy expended in vapor compression is large in this example, it is more meaningful to evaluate system performance in terms of a "coefficient of performance" (C.O.P.), than it is to examine performance in terms of the fractional recovery of latent heat. In the present example, the C.O.P., defined as the ratio of energy recovered to compressive work required, is equal to 3.4 (i.e., 63.6 Btu/SCF ÷ 18.5 Btu/SCF).

The separation membrane employed in the present invention must be highly permeable to the stripping vapor which it is desired to recover and highly impermeable to the gases stripped from the liquid. The membrane should also be able to withstand continuous operation at elevated temperatures and at high humidities without deterioration.

The optimum membrane for water vapor recovery should be made from a hydrophilic polymer. Such polymers are not only highly permeable to water; they are also likely to be relatively impermeable to many noncondensable gases, since such gases often exhibit low solubility in water and hence, by analogy, should exhibit low solubility in a hydrophilic membrane. The permeability coefficient is the product of the solubility and diffusivity of the permeant in the membrane. Because water and noncondensable gases have similar molecular weights, their diffusivities in polymers are also usually comparable. Thus because of the differences in solubilities and similarities in diffusivities, a hydrophilic polymeric membrane material can be expected to exhibit both high permeability to water and low to moderate permeability to many gases.

Suitable membranes useful in removing water vapor include hydrophilic polymeric reverse-osmosis desalination membranes. Reverse-osmosis membranes are known to exhibit a permeability to water vapor that is typically one hundred times greater than their permeability to the gases oxygen and nitrogen, and about ten to twenty times greater than their permeability to $CO_2$, at least when these vapor and gas permeabilities are measured in separate experiments. Examples of such membranes are interfacially-polymerized composite reverse-osmosis membranes such as are made by interfacial reaction of polyethyleneimine with isophthaloyl chloride at the surface of a microporous polysulfone substrate, and a polyamide formed from piperazine and a mixed acyl halide reagent, both described by Cadotte et al. in *J. Macromol. Sci. Chem.* A15(1981)727. Other examples are the more conventional asymmetric reverse-osmosis membranes formed from a casting solution of cellulose acetate, acetone, magnesium perchlorate, and water, from which it is possible to prepare hydrophilic membranes known in the art as the Loeb-Sourirajan type described by Loeb et al. in *Adv. Chem. Ser.* 38(1962)117. Other exemplary membranes include the nitrogen-linked aromatic polyamide membranes described by Richter and Hoehn in U.S. Pat. No. 3,567,632.

Especially preferred water-vapor-permeable membranes are those used in gas separations. These are exemplified by the silicone rubbers including polydimethylsiloxane described by Robb in *Ann. NY Academy of Sci.* 146(1967)119 and by Konikoff et al. in U.S. Pat. No. 3,303,105; the organopolysiloxane-polycarbonate block copolymers as described by Ward et al. in *J. Memb. Sci.* 1(1976)99; cellulose and its esters including cellulose butyrate and cellulose acetate as described by Schell and Houston in *Chem. Engr. Progr.* 78:10(1982)38; sulfonated 2,6-dimethyl polyphenylene oxide described by Salemme in U.S. Pat. No. 3,735,559 and by Ward and Salemme in U.S. Pat. No. 3,780,496; natural and synthetic rubbers including cis-1,4-polyisoprenes described by Barrie et al. in *Polymer* 16(1975)811; and polyvinylalcohol described by Spencer and Ibrahim in *J. Poly. Sci.: Part A-2* 6(1968)2067.

Water vapor and gas permeabilities for the above materials are presented in the references cited. Because the permeability of water vapor in particular can depend strongly on the conditions of its measurement (e.g., temperature and relative humidity), it is impractical to provide a comprehensive tabulation of vapor and gas permeabilities in this specification. However, exemplary permeation data for an acceptable water-selective polymeric membrane particularly useful in the practice of the present invention may be cited. Dimethyl silicone rubber is characterized by the room temperature water vapor and gas permeabilities shown in Table I, where the membrane permeability $Pr_i$ to a particular permeant is measured in the following units:

$$\frac{cm^3 \text{ gas } (STP) - cm \text{ thickness}}{cm^2 \text{ membrane area-sec-cm Hg pressure difference.}}$$

The membrane separation factor $a_{ij}$ is given by the ratio of component permeabilities $$a_{ij} = Pr_i/Pr_j.$$

Water vapor/gas separation factors for silicone rubber are also presented in Table I.

TABLE I

Permeability of Dimethyl Silicone Rubber to Gases and Vapors

| Gas or Vapor | Permeability $Pr_i$* | Water Vapor/Gas Separation Factor $a_{ij}$ |
|---|---|---|
| $N_2$ | $28 \cdot 10^{-9}$ | 130 |
| $O_2$ | $60 \cdot 10^{-9}$ | 60 |
| CO | $34 \cdot 10^{-9}$ | 106 |
| $C_2H_4$ | $135 \cdot 10^{-9}$ | 27 |
| $CO_2$ | $325 \cdot 10^{-9}$ | 11 |
| $NH_3$ | $590 \cdot 10^{-9}$ | 6 |
| $H_2O$ Vapor | $3600 \cdot 10^{-9}$ | — |
| $CH_3OH$ Vapor | $1390 \cdot 10^{-9}$ | — |

*$cm^3(STP)$-$cm/cm^2$-sec-cmHg

It must be emphasized that these and other permeabilities cited in this specification have been measured for the most part in pure component permeation experiments performed at room temperature. It is well known that the gas permeabilities of many polymers increase to a greater or lesser extent as the relative humidity of the permeant mixture increases, and for such polymers the vapor/gas separation factors relevant to the permeation of these mixtures may be expected to be somewhat lower than those estimated from pure component permeability coefficients. Furthermore, membrane selectivity will decrease as the temperature of operation is increased.

Sulfonated, 2,6-dimethyl polyphenylene oxide as described by Salemme in U.S. Pat. No. 3,735,559 also has favorable permeation characteristics. Its water vapor permeability ranges from approximately $1000-30,000 \cdot 10^{-9}$ $cm^3(STP)$-$cm/cm^2$-sec-cmHg, dependent on relative humidity, whereas the $N_2$, CO, and $CO_2$ permeabilities of the $Na^+$-counterion form of the resin are $0.12 \cdot 10^{-9}$, $0.13 \cdot 10^{-9}$, and $3.9 \cdot 10^{-9}$, respectively. Thus, the $H_2O/CO$ and $H_2O/CO_2$ separation factors estimated for this material on the basis of pure component permeabilities are on the order of $10^2$ to $10^3$. Sulfonated, 2,6-diphenyl polyphenylene oxide as disclosed in the same reference is claimed to have superior heat resistance combined with desirable vapor permeation properties. Finally, gas-separation membranes prepared from blends of cellulose diacetate and cellulose triacetate are known to be highly water-vapor-permeable ($Pr_{H_2O} = 10-1000 \cdot 10^{-9}$ $cm^3(STP)$-$cm/cm^2$-sec-cmHg). Again, vapor/gas separation factors can be expected to be very dependent on temperature and relative humidity, with estimated $H_2O/CO$ and $H_2O/CO_2$ separation factors of about 300 and 15, respectively.

Other water-permeable membrane polymers useful in the practice of the present invention include ethyl cellulose, polyethyleneimine, ion-exchange polymers including the polystyrene sulfonates, polyvinyl butyral, polyvinyl acetate, polyethyl methacrylate, aliphatic polyamides including Nylon 6, polybutadiene, aromatic polyamides, polyimides, and polybenzimidazoles. The vapor and gas permeabilities of a number of these materials can be found, for example, in the following references: Rogers, "Permeability and Chemical Resistance," Chap. 9 in *Engineering Design for Plastics* (1964); Hwang et al., *Separation Science* 9(1974)461; Hauser and McCaren, *Ind. Eng. Chem.* 40(1948)112; and Barrie, "Water in Polymers," Chap. 8 in *Diffusion in Polymers* (1968).

Membranes that are highly selective for the permeation of vapors in preference to gases are desirable for several reasons. First, any gas that permeates across the membrane must be compressed with the co-permeating vapor, and the energy of compression increases in direct proportion to the volume of the vapor/gas mixture being compressed. Secondly, the presence of noncondensable gases interferes with vapor condensation by blanketing condenser heat exchange surfaces and slowing heat transfer. Thirdly, the presence of noncondensables limits the extent of vapor condensation at given condenser operating conditions.

These effects related to finite membrane selectivity are readily illustrated by extending the above example for a hot potassium carbonate stripping column producing a 35% $CO_2$ in water vapor overhead mixture at 230° F. and 17 psia. As before, the permeate pressure $P_2$ is taken to be 5.0 psia, and the vacuum pump/compressor discharge pressure $P_3$ is set at 32.5 psia. In order to demonstrate the effects of low selectivity between vapor and gas, a calculation was performed for a hypothetical membrane exhibiting a modest $H_2O/CO_2$ separation factor of 10. Furthermore, 80% recovery of water vapor in the membrane separator was assumed, since high vapor recovery exacerbates the effects of low selectivity.

The permeate stream is estimated to contain 85.2% water vapor and 14.8% $CO_2$ at these operating conditions. (All compositions are reported as mole percent.) The compression power varies directly with the amount of gas and vapor being handled and is somewhat dependent on its composition. Thus the effect of low selectivity i.e., $\alpha H_2O/CO_2=10$) and the attendant permeation of carbon dioxide is to increase the power required for compression by approximately 18% to 15.0 Btu/SCF (i.e., 12.8/0.85).

Although pure water vapor at 32.5 psia could be completely condensed at about 255° F., the presence of 14.8% $CO_2$ in the mixture with steam reduces the dewpoint or temperature of initial vapor condensation. The dewpoint can be calculated as the saturation temperature corresponding to the partial pressure of steam in the mixture, 27.7 psi i.e., (0.852).(32.50)). This maximum condensing temperature of 246° F. corresponding to this water vapor pressure provides a very marginal temperature difference across the heat transfer surfaces of a reboiler operating at 245° F. More importantly, only a negligible fraction of the vapor in the mixture can be condensed at its dewpoint. If it is desired to condense 50% of the steam in the permeate mixture, then the partial pressure of uncondensed water vapor in the mixture exiting the condenser will fall to 24.1 psi, and the temperature of condensation will be lowered still further to 239° F. This temperature is too low for recovery of latent heat in the reboiler operating at 245° F. Thus, relatively small concentrations of noncondensable gases in the permeate may significantly limit the extent and temperature of condensation of recovered vapor. The remedies are to choose membranes with vapor/gas selectivities as high as possible and, in the present case, to compensate for $CO_2$ permeation by increasing the condensing pressure $P_3$.

High vapor/gas selectivity is particularly important if the compressed permeate mixture is to be injected directly into the stripping column as "live" stripping vapor (see FIG. 3). In that event, the presence of stripped gas in the mixture would reduce the driving force for gas desorption in the stripping column (and thereby increase the column size), and it would increase the equilibrium concentration of gas in the lean, stripped liquor.

Although the above discussion has focused on the steam stripping of aqueous absorbents and sour water/process condensate waste water streams, the process of the present invention will also find application in the recovery of energy from mixtures of organic solvent vapors and gases that are produced in stripping operations. For example, the Rectisol process for the removal of $H_2S$ and $CO_2$ from hydrocarbon and synthesis gas streams is based on their absorption in cold methanol. Solvent regeneration is accomplished by flashing and by stripping with methanol vapor generated in a steam-heated reboiler operated at about 150° F. as described by Kohl and Riesenfeld in the reference cited above. Other volatile organic solvents from which dissolved gases may have to be stripped on occasion include members of the following groups: the chlorinated hydrocarbons including carbon tetrachloride, chloroform, methylene chloride, trichloroethylene, trichloroethane, perchloroethylene, ethylene dichloride, and propylene dichloride; the hydrocarbons including naphtha and petroleum ether; ketones including acetone and cyclohexanone; ethers; the alcohols including methyl, ethyl, isopropyl, and butyl alcohols; and the aromatic hydrocarbons including benzene, toluene, and xylene.

Membranes permeable to organic solvent vapors that are suitable for use in the method of the present invention may be prepared from the following polymers: the polyamides including Nylon 6 and Nylon 12; polyethylene; polypropylene; cellulose acetate; silicone rubber, poly(butadiene-acrylonitrile) rubber; polyethylene-styrene copolymers; polyvinylacetate; poly(ethylene terephalate); poly(tetrafluoroethylene)-poly(4-vinyl pyridine or N-vinyl pyrrolidone) graft copolymers; and acrylonitrilevinylacetate copolymers. For example, a poly(butadiene acrylonitrile) rubber membrane may be suitable for use in the present invention as applied to the Rectisol process, where the separation of methanol vapor from stripped $CO_2$ gas is a step in the recovery of the energy contained in the vapor. The $CH_3OH/CO_2$ separation factor of this polymer is about 1900 as calculated from pure component methanol and carbon dioxide permeabilities of $246.10^{-9}$ and $0.13.10^{-9}$ $cm^3$(STP)-$cm/cm^2$-sec-cmHg, respectively. Silicone rubber would be marginally useful in this application; its $CH_3OH/CO_2$ separation factor is about 4.3 as calculated from permeation data in Table I.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. In a process for stripping noncondensable or high-vapor-pressure gases from a liquid by contacting said liquid with a stripping vapor and thereby producing an overhead mixture of gas and stripping vapor, the improvement comprising:
   (a) separating said stripping vapor in said overhead mixture by passing it through a membrane that is substantially permeable to said separated stripping vapor and substantially impermeable to said gas;
   (b) compressing and condensing said separated stripping vapor; and
   (c) recovering said separated, condensed stripping vapor and the sensible and latent heat thereof.

2. The process of claim 1 wherein said separated stripping vapor is condensed in a reboiler whereby stripping vapor is generated from said stripped liquid.

3. In a process for stripping noncondensable or high-vapor-pressure gases from a liquid by contacting said liquid with a stripping vapor and thereby producing an overhead mixture of gas and stripping vapor, said process being conducted in a stripping column with a base, the improvement comprising:
   (a) separating said stripping vapor in said overhead mixture by passing it through a membrane that is substantially permeable to said stripping vapor and substantially impermeable to said gas;
   (b) compressing said separated stripping vapor; and
   (c) injecting said compressed stripping vapor directly into the base of said stripping column as live stripping vapor.

4. In a process for the purification of gases utilizing selective absorption of one or more gaseous components dissolved in a liquid absorbent solution followed by regeneration of the spent liquid absorbent solution in a steam or vapor stripping operation producing an overhead mixture of stripped gas and stripping vapor, the improvement comprising:
   (a) separating said stripping vapor in said stripper overhead mixture by passing it through a membrane that is substantially permeable to said stripping vapor and substantially impermeable to said stripped gas;
   (b) compressing and condensing said separated stripping vapor;
   (c) recovering the heat of condensation of said stripping vapor; and
   (d) transferring by heat transfer means said recovered heat of condensation to said liquid absorbent solution.

5. The process of claim 4 wherein said dissolved gaseous components are selected from hydrogen sulfide and carbon dioxide.

6. The process of claim 1 wherein said stripping process takes place in a stripping column having a base for accumulating stripped liquid and wherein said compressed stripping vapor is condensed in a heat exchanger which is in heat exchange communication with said accumulated stripped liquid in said stripping column base.

7. The process of claim 4 wherein said stripping process takes place in a stripping column having a base for accumulating stripped liquid and wherein said compressed stripping vapor is condensed in a heat exchanger which is in heat exchange communication with said accumulated stripped liquid in said stripping column base.

8. The process of claim 4 wherein said compressed stripping vapor component is condensed in a reboiler whereby stripping vapor is generated from said liquid absorbent solution.

9. In a process for the purification of gases utilizing selective absorption of one or more gaseous components dissolved in a liquid absorbent solution followed by regeneration of the spent liquid absorbent solution in a steam or vapor stripping operation producing an overhead mixture of stripped gas and stripping vapor, said process being conducted in a stripping column with a base, the improvement comprising:
   (a) separating said stripping vapor in said overhead mixture by passing the stripping vapor in said stripper overhead mixture through a membrane that is substantially permeable to said stripping vapor and substantially impermeable to said stripped gas;
   (b) compressing said separated stripping vapor; and
   (c) injecting said compressed stripping vapor directly into the base of said stripping column as live stripping vapor.

10. The process of claims 4 or 9 wherein said separated stripping vapor is compressed with a mechanical compressor or a vacuum pump.

11. The process of claim 9 wherein said dissolved gaseous components are selected from hydrogen sulfide and carbon dioxide.

12. In a process for stripping high-vapor-pressure contaminants from an aqueous process stream by contacting said aqueous process stream with a condensable stripping vapor and thereby producing an overhead mixture of gas and stripping vapor, the improvement comprising:
   (a) separating the stripping vapor in said overhead mixture by passing it through a membrane that is substantially permeable to said stripping vapor and substantially impermeable to said gas;
   (b) compressing and condensing said separated stripping vapor; and
   (c) recovering both said separated, condensed, stripping vapor and the sensible and latent heat thereof.

13. The process of claim 12 wherein said process takes place in a stripping column having a base for accumulating stripped liquid and wherein said compressed stripping vapor component is condensed in a heat exchanger which is in heat exchange communication with said accumulated stripped liquid in said stripper column base.

14. The process of claim 12 wherein said compressed stripping component is condensed in a reboiler whereby stripping vapor is generated from said stripped aqueous process stream.

15. The process of claims 6, 8, 13 or 14 wherein said recovered and condensed stripping vapor is returned to the top of said stripping column as liquid reflux.

16. In a process for stripping high-vapor-pressure contaminants from an aqueous process stream by contacting said aqueous process stream with a condensable stripping vapor and thereby producing an overhead mixture of gas and stripping vapor, said process being conducted in a stripping column with a base, the improvement comprising:
   (a) separating the stripping vapor in said overhead mixture by passing it through a membrane that is substantially permeable to said stripping vapor and substantially impermable to said gas;

(b) compressing said separated stripping vapor; and (c) injecting said compressed stripping vapor directly into the base of said stripping column as live stripping vapor.

17. The process of claims 12 or 16 wherein the high-vapor-pressure contaminant is selected from hydrogen sulfide and ammonia.

18. The process of claims 4, 9, 12 or 16 wherein the relative humidity, temperature and partial pressure of water or solvent vapor of said stripper overhead mixture are, respectively, from about 30% to about 100%, from about 100° F. to about 300° F., and at least 2 psi.

19. The process of claims 1, 3, 4, 9, 12 or 16 wherein said stripping vapor is water vapor.

20. The process of claim 9 wherein said membrane is a hydrophilic polymeric membrane.

21. The process of claim 19 wherein said membane is selected from silicone rubbers, natural rubber, synthetic rubbers, cellulose, cellulose esters, polyvinyl alcohol, polyethyleneimine, arylene oxide polymers, arylene oxide ion-exchange polymers, polystyrene sulfonates, polyvinyl butyral, polyvinylacetate, polyethylmethacrylate, polybutadiene, aliphatic polyamides, aromatic polyamides, polyimides, and polybenzimidazoles.

22. The process of claims 1, 3, 4, 9, 12 or 16 wherein said stripping vapor is an organic solvent vapor selected from chlorinated hydrocarbons, aliphatic hydrocarbons, aromatic hydrocarbons, ketones, ethers, and alcohols.

23. The process of claim 22 wherein said membrane is prepared from a polymer selected from polyamides, polyethylene, polypropylene, cellulose acetate, silicone rubbers, poly(butadiene-acrylonitrile) rubber, polyethylene-styrene copolymers, polyvinylacetate, poly(ethylene terephthalate), poly(tetrafluoroethylene)poly(4-vinyl pyridine or N-vinyl pyrrolidone) graft copolymers, and acrylonitrile-vinylacetate copolymers.

* * * * *

UNITED STATES PATENT AND TRADEMARK OFFICE
CERTIFICATE OF CORRECTION

PATENT NO.   : 4,444,571
DATED        : April 24, 1984
INVENTOR(S)  : Stephen L. Matson It is certified that error appears in the above-identified patent and that said Letters Patent is hereby corrected as shown below:

| | |
|---|---|
| In the Abstract, Line 14 | Change "compessed" to --compressed--. |
| Col. 2, Line 38 | Change "gas vapor" to --gas/vapor--. |
| Col. 13, Line 48 | Insert before "i.e.," --(--. |
| Col. 13, Line 58 | Insert before "i.e.," --(--. |
| Col. 17, Line 17 | Change "9" to --19--. |

Signed and Sealed this

Twenty-eighth Day of May 1985

[SEAL]

Attest:

DONALD J. QUIGG

Attesting Officer    Acting Commissioner of Patents and Trademarks